United States Patent [19]
Poduje et al.

[11] Patent Number: 5,557,267
[45] Date of Patent: Sep. 17, 1996

[54] APPARATUS AND METHODS FOR MEASUREMENT SYSTEM CALIBRATION

[75] Inventors: Noel S. Poduje, Needham Heights; Scott P. Keller, Lincoln; Roy Mallory, Bedford, all of Mass.

[73] Assignee: ADE Corporation, Newton, Mass.

[21] Appl. No.: 52,384

[22] Filed: Apr. 23, 1993

[51] Int. Cl.$^6$ .................. G08C 15/06; G08C 19/22; G01R 35/00
[52] U.S. Cl. ............ 340/870.04; 324/601; 324/658
[58] Field of Search ................................. 324/601, 658; 340/870.04, 870.05, 870.21, 500, 501, 511, 562; 341/110, 115, 120

[56] References Cited

U.S. PATENT DOCUMENTS

| | | | |
|---|---|---|---|
| 3,880,006 | 4/1975 | Poduje | 73/362 AR |
| 4,795,965 | 1/1989 | Dooley | 324/601 |
| 4,912,397 | 3/1990 | Gale et al. | 324/132 |
| 4,918,376 | 4/1990 | Poduje et al. | 324/663 |

OTHER PUBLICATIONS

"Computer Chips Give New Life To LVDTs," *News Mechatronics*, May 28, 1993, pp. 32, 39.
Product Literature, "Labetch—Notebook And Notebook/XE (Laboratory and Product Test Software),"by Labtech, 400 Research Drive, Wilmington, MA 01887, (undated), 21 pages.

Product Literature, "The Schlumberger Digital Probe" and Product Introduction Letter, of *Schlumberger Industries Inc.*, 301 Cayuga Road, Buffalo, NY 14225–1990, (undated).

*Primary Examiner*—Edward L. Coles, Sr.
*Assistant Examiner*—Thomas D. Lee
*Attorney, Agent, or Firm*—Weingarten, Schurgin, Gagnebin & Hayes

[57] ABSTRACT

Apparatus and methods for calibrating a transducer measurement system having a plurality of subsystems, permitting total system calibration by a few selected adjustments without requiring complete system calibration when a new subsystem is added or a subsystem replaced and without requiring adjustments to be made to each individual subsystem. The measurement system provides a calibrated measurement signal indicative of a characteristic of an object with which the transducer interfaces. Each subsystem is characterized in terms of a minimum number of parameters associated therewith and the parameters are mathematically combined to reflect values of adjustable subsystem or system components. In this manner, variations associated with each separable subsystem from nominal, specified values, are combined and corrected by a single adjustment of a minimum number of selected adjustable components representing the degrees of freedom for errors in the system. In an alternate embodiment, a signal processor is responsive to the subsystem describing parameters for processing a digital replica of a measured signal to provide the calibrated measurement signal.

13 Claims, 4 Drawing Sheets

APPARATUS AND METHODS FOR MEASUREMENT SYSTEM CALIBRATION

FIELD OF THE INVENTION

This invention relates generally to measurement systems and more particularly, to transducer measurement system apparatus and methods for improved calibration.

BACKGROUND OF THE INVENTION

Transducer measurement systems are known for measuring various characteristics of an object, such as temperature, thickness, conductivity, etc. In one such system, the transducer provides an output signal that is processed to generate an electrical signal having a voltage level related to the distance between the transducer and the object. In one exemplary use of the system, the transducer is a capacitive probe and the characteristic of the object to be measured is the flatness of the object. Such a measurement is provided by obtaining multiple transducer output signals in response to measurements at multiple locations of a particular object. Examples of typical objects are semiconductor wafers and disks for disk drives.

As is known, such measurement systems generally include a plurality of subsystems, such as inter alia, a transducer subassembly, a "front end" circuit, such as may contain a preamplifier, for converting the transducer output signal into a corresponding electrical signal having a voltage level related to, and ideally proportional to, the measured characteristic, a signal conditioning circuit for conditioning the electrical signal and providing an output measurement signal indicative of the measured object characteristic, and a display circuit for displaying a representation of the measured object characteristic. Ideally, parameters of the constituent subsystems meet predetermined specifications so that the output measurement signal has a known mathematical relationship to the measured object characteristic. However, typically these parameters vary within a range due to such effects as component tolerances and stray capacitance. When the subsystem parameters vary, the output measurement signal may not be an accurate representation of the measured object characteristic, but may be in error in such parameters as gain, offset, linearity, etc.

One technique used for calibrating transducer measurement systems in order to ensure that the output measurement signal maintains a known relationship to the measured characteristic is to perform a "system level calibration" using one or more reference objects (i.e., an object having a known characteristic to be measured). More particularly, output signals from the integrated system, obtained in response to several reference objects, are set to predetermined reference levels by adjusting one or more variable components within the system. That is, the variable component is adjusted until the output signal is brought into conformity with predetermined values. For example, an adjustment may be achieved by adjusting a potentiometer within the system. With this calibration technique, if one of the subsystems is replaced, the system level calibration must be repeated. Thus, obtaining a replacement subsystem requires the user to either send the entire measurement system back to the manufacturer for subsystem replacement and system re-calibration, have a repair person travel to their facility to replace the subsystem and re-calibrate the system, or possess the requisite skill and apparatus for recalibrating the system after installation of a replacement subsystem.

Another technique for calibrating transducer measurement systems is a to perform a "subsystem level calibration" in which each individual subsystem is calibrated separately. More particularly, the output signal from a subsystem, obtained in response to each reference object, is set to a predetermined value for that subsystem by adjusting variable components within that subsystem. Each subsystem is adjusted, until the final output signal is brought into conformity. However, this type of "subsystem level calibration" tends to be labor intensive since adjustments must be made to each individual subsystem.

SUMMARY OF THE INVENTION

In accordance with the present invention, apparatus and methods are provided for calibrating a transducer measurement system having a plurality of subsystems in a manner that avoids calibration of the entire system when a new subsystem is added or when a subsystem thereof is replaced and also that avoids adjusting each individual subsystem, while maintaining accurate calibration or acceptably close to that standard. The transducer measurement system provides a calibrated measurement signal indicative of a characteristic of an object with which the transducer interfaces. Preferably, each subsystem is initially characterized to determine at least one parameter associated with it alone which is descriptive of variations associated with that subsystem from a nominal, specified value. Such parameter may represent variations of the subsystem due to the effects of component tolerances or stray capacitance which, if not compensated, may result in errors in the measured signal. The set of such subsystem describing, or variation indicating, parameters is converted, mathematically, into adjustments in a minimum number of adjustable components located in the system at selected points so that, when thus adjusted, the total system output will be in conformity with a predetermined standard even though individual subsystem outputs may deviate from a nominal, predetermined value. In an alternate embodiment, a signal processor is responsive to the set of subsystem describing parameters for processing a digital replica of a measured signal to provide a digital calibrated measurement signal.

With both such arrangements, a benefit over subsystem level calibration is achieved in that the number of actual circuit adjustments may be minimized (i.e., as compared to adjusting each individual subsystem as is done in conventional subsystem level calibration). However, the present calibration apparatus and techniques do not suffer the drawback associated with conventional system level calibration by requiring "re-calibration" of the entire system whenever a subsystem is added or replaced. When a subsystem of the present invention is added or replaced, its descriptive characteristics or parameters, determined before installation, are used in the mathematical algorithm in combination with the characterized parameters of the remaining, unreplaced subsystems, to determine a new set of adjustments. When such adjustments are made, the system as a whole will then perform with the same accuracy as if a complete system calibration had occurred, or acceptably close to that standard.

More particularly, in one embodiment, a measurement system includes a transducer, having at least one transducer parameter associated therewith, which interfaces with an object to provide a transducer output signal. A signal conversion and conditioning circuit, coupled to the transducer, converts the transducer output signal into an intermediate signal having a voltage amplitude related to the measured object characteristic. The signal conversion and conditioning circuit is adjustable in accordance with a mathematical combination of at least one of the transducer parameter and the signal conversion and conditioning parameter to provide a calibrated measurement signal indicative of the measured object characteristic.

Exemplary parameters describing the transducer subsystem, which in one embodiment is a capacitive probe, are a transducer gain parameter and a transducer stray capacitance parameter. The signal conversion and conditioning circuit may also be described by corresponding gain and stray capacitance parameters. The signal conversion and conditioning circuit includes an adjustable component, such as a set of switches establishing a digital word, the value of which adjusts the digital input signal of a digital to analog converter, with the switches being positioned in accordance with the mathematically determined adjustments. In one embodiment, the signal conversion and conditioning circuit includes a plurality of adjustable components, each one corresponding to a degree of freedom of error of the measurement system to provide the calibrated measurement signal. For example, a first adjustable component corresponds to the gain error of the entire system and a second adjustable component corresponds to the linearity error of the entire system.

In accordance with an alternate embodiment of the invention, a measurement system for measuring an object characteristic, includes a transducer having at least one variation indicating parameter associated therewith and interfacing with the object to provide a transducer output signal. A signal conversion and conditioning circuit, coupled to the transducer and having at least one variation indicating parameter associated therewith, converts the transducer output signal into an intermediate signal having a voltage amplitude related to the measured object characteristic and provides a digital replica signal corresponding to the intermediate signal. A signal processor processes the digital replica signal in response to a mathematical combination of at least one of the transducer parameter and the signal conversion and conditioning parameter to provide a digital calibrated measurement signal indicative of the measured object characteristic.

BRIEF DESCRIPTION OF THE DRAWINGS

The foregoing features of this invention, as well as the invention itself, may be more fully understood from the following detailed description of the drawings in which.

DESCRIPTION OF THE PREFERRED EMBODIMENT

Figure 1:
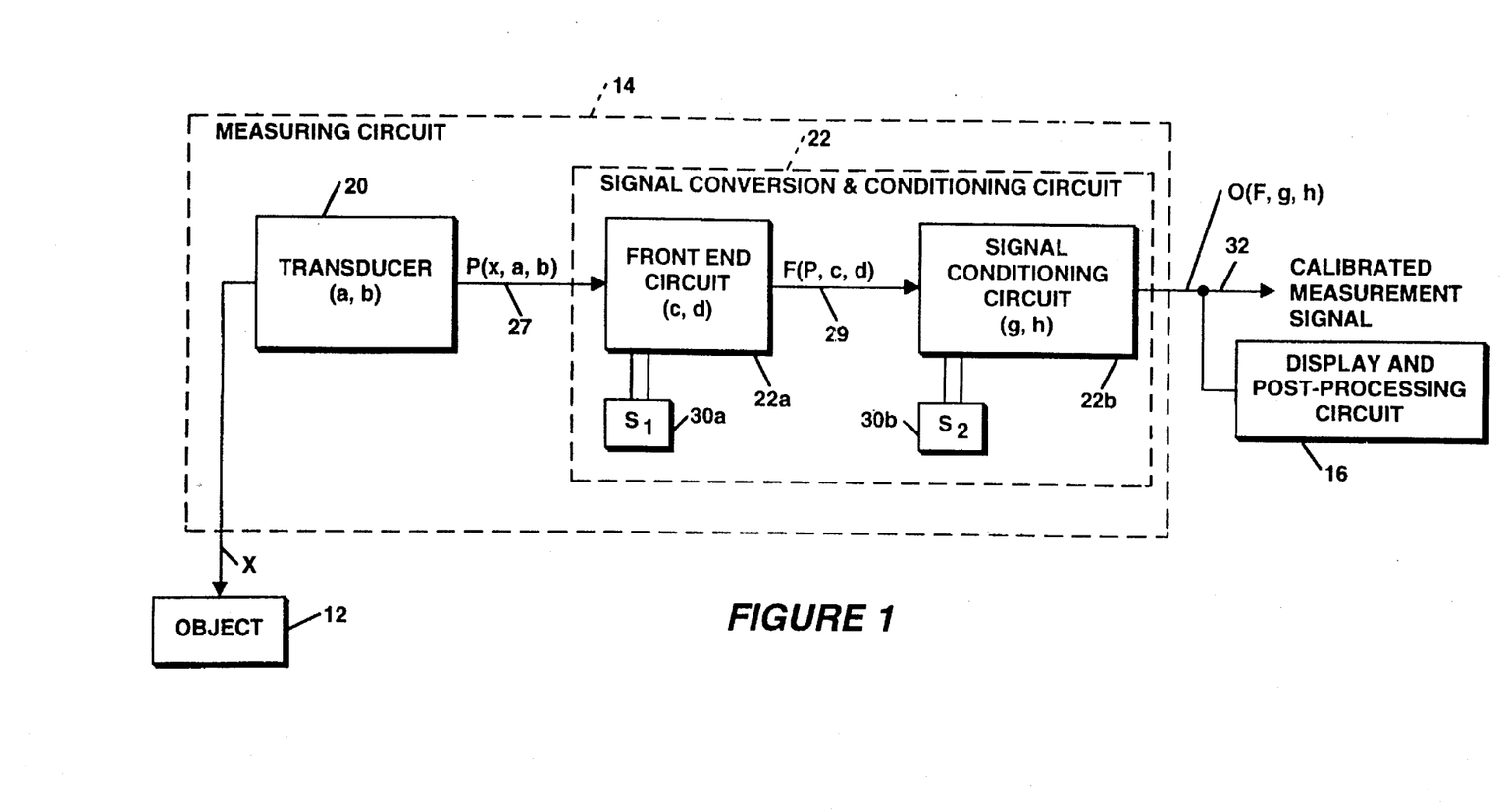
FIG. 1 is a block diagram of a calibrated transducer measurement system in accordance with one embodiment of the invention.

Referring to FIG. 1, a generalized transducer measurement system, including a measuring circuit 14 and a postprocessing circuit 16, is provided to measure a characteristic of an object 12. The measuring circuit 14 includes a transducer 20 adapted for interfacing with the object 12 to measure a desired characteristic thereof, such as flatness, temperature, conductivity, etc. More generally however, the object 12 is an entity having a physical characteristic to be measured. Moreover, the transducer 20 is an appropriate device for measuring the desired characteristic of a particular object and may, for example, be a capacitive probe or a strain gauge. The measuring circuit 14 further includes a signal conversion and conditioning circuit 22, coupled to the transducer 20, and here, shown to include a front end circuit 22a and a signal conditioning circuit 22b. More particularly, the transducer 20 provides a transducer output signal P(x, a, b), or signal 27, to the front end circuit 22a which converts the transducer output signal 27 into an intermediate signal F(P, c, d), or signal 29, having a voltage amplitude related to the measured object characteristic. Stated differently, the front end circuit 22a provides an excitation to the transducer 20 and recovers an electrical signal therefrom related to the measured characteristic. For example, when the measured object characteristic is distance or displacement, transducer 20 may be a capacitive probe, used to provide a transducer output signal 27 indicative of the capacitance measured between the transducer 20 and the object 12, and front end circuit 22a converts the capacitance indicating transducer output signal 27 into an intermediate electrical signal 29 having an amplitude related to the distance between the transducer 20 and object 12. Moreover, a plurality of such distance measurements may be taken at a corresponding plurality of locations of an object to obtain a measure of the flatness of the object.

The signal conditioning circuit 22b receives and processes the intermediate signal 29 to provide a calibrated measurement signal O (F, g, h), or signal 32, indicative of the measured object characteristic. The signal conditioning circuit 22b may comprise analog filtering circuits, for example. Post-processing circuit 16 receives the analog calibrated measurement signal 32 and displays a representation thereof to a user. While the generalized transducer measurement system of FIG. 1 is shown to include a transducer subsystem 20, a front end subsystem 22a, and a signal conditioning subsystem 22b, it is noted that other subsystem arrangements are suitable for calibration in accordance with the present invention.

The transducer 20 has at least one parameter, and here two parameters a, b, associated therewith which describe the subsystem 20. More particularly, each such subsystem describing parameters a, b is indicative of a variation of the subsystem from a nominal predetermined, or specified, value and thus, may be alternatively referred to as variation indicating parameters a, b. Such variations may be caused by component tolerances or other phenomena such as stray capacitance which, if not compensated by calibration, may result in errors in the measured signal.

Figure 2:
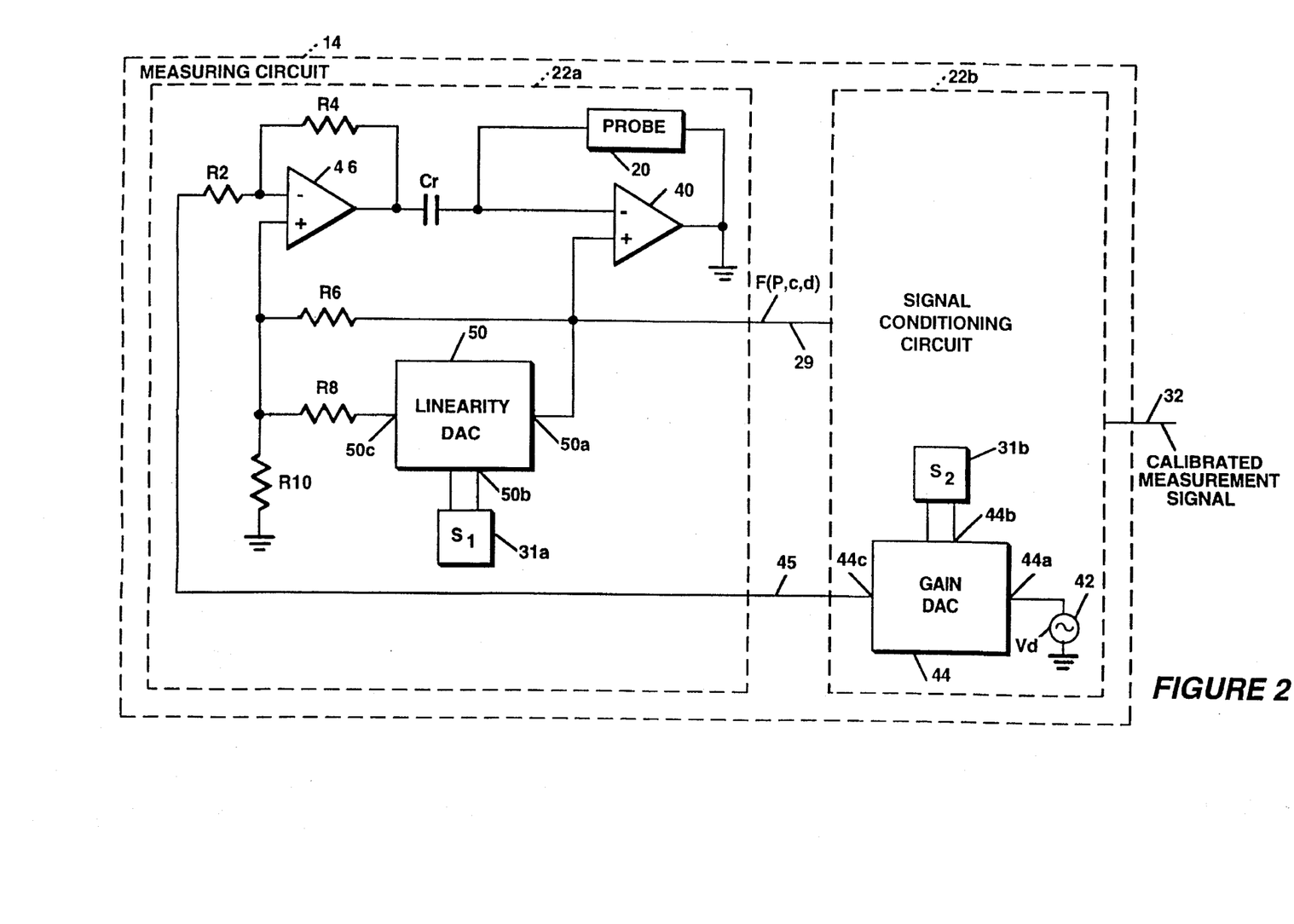
FIG. 2 is a circuit schematic of an embodiment of the transducer measurement system of FIG. 1.

The variation indicating parameters a, b of the transducer subsystem 20 are determined, or characterized, and used to calibrate the measurement system of FIG. 1 in a manner described hereinafter. In one embodiment in which the transducer 20 is a capacitive probe, the transducer output signal 27 may be expressed by:

$$P(x,a,b) = \frac{A_p \epsilon_o}{x} + Co_1 = \frac{a \epsilon_o}{x} + b \quad (1)$$

where $_p$ is a gain parameter of the transducer 20, $\epsilon_o$ is a constant, here equal to $8.850 \times 10^{-12}$ farads/meter, x is the measurement variable (which in the above example is the distance between the transducer 20 and the object 12), and $Co_1$ is a stray capacitance parameter associated with the transducer 20. The transducer gain $A_p$ and the transducer stray capacitance $Co_1$ are parameters associated with the transducer 20 which describe variations therein from a nominal, specified value so that here, variation indicating parameter $a=A_p$ and $b=Co_1$, as indicated in equation (1) above. Similarly, the signal conversion and conditioning circuit 22 and, more particularly, the front end circuit 22a thereof, has at least one parameter, and here two parameters c, d, associated therewith which are descriptive of such subsystem, such parameters c, d also being determined, or characterized, and used to calibrate the measurement system of FIG. 1. The intermediate signal 29 may be expressed generally by:

$$F(P,c,d) = V_d \frac{A_s C_r}{P(x) + Co_2} = V_d \frac{c C_r}{P(x) + d} \quad (2)$$

where $V_d$ is a front end drive signal and $C_r$ is a reference capacitor value, both of which will become apparent from the discussion of FIG. 2 below. A gain parameter associated with the front end circuit 22a is given by $A_s$ and $Co_2$ is a stray capacitance parameter associated with the front end circuit 22a. The front end gain $A_s$ and the front end stray capacitance $Co_2$ describe variations of the front end circuit 22a from nominal, predetermined values so that here, subsystem describing parameter $c=A$, and $d=Co_2$, as indicated in equation (2) above.

The generalized system of FIG. 1 includes a minimum number of adjustable components for eliminating the variations associated with all of the constituent subsystems thereof from corresponding predetermined values. Here, the signal conversion and conditioning circuit 22 includes adjustable components 30a, 30b which are adjustable in response to variation indicating parameters a, b, c, and d. That is, the system can be truncated here, or the signal conditioning 22b, having variation indicating parameters g and h associated therewith, may be included to provide adjustments for components 30a, 30b. The signal conversion and conditioning circuit 22 is adjustable in accordance with adjustments determined by a mathematical combination of at least one of the variation indicating parameters a–b, c–d, and g–h, and as many as all such parameters, as represented generally by the following formula:

$$\begin{bmatrix} S_1 \\ S_2 \end{bmatrix} = f[a,b,c,d,g,h] \quad (3)$$

In ideal operation, the parameters (i.e., a–b, c–d, and g–h) associated with each of the subsystems (i.e., transducer 20, front end circuit 22a, and signal conditioning circuit 22b, respectively) have nominal, specified values, so that when such subsystems are interconnected to provide measurement system of FIG. 1, the resulting measurement signal is an accurate representation of the measured object characteristic. Stated differently, preferably each of the subsystems 20, 22a, 22b has a known, specified transfer function so that in response to a reference measurement, the resulting measurement signal conforms to a predetermined value. However typically phenomena, such as stray capacitance and component tolerances, cause an error in the output measurement signal.

The present invention reduces, and preferably removes, any such error in the output measurement signal by providing calibration with a minimum number of adjustable components at selected system locations. As mentioned, the signal conversion and conditioning circuit 22 is adjustable in accordance with adjustments determined by mathematically combining the subsystem describing parameters of each individual subsystem, in accordance with equation (3) above. The resulting adjustments $S_1$, $S_2$ represent a particular setting of adjustable components 30a, 30b. In this way, error, otherwise present in the resulting measurement signal, is compensated. Put a different way, the transfer function of the circuit 22 (i.e., the relationship between the measurement output signal 32 and the transducer output signal 27) is adjusted in response to adjustments $S_1$, $S_2$ to provide the calibration measurement signal 32, accurately representing the measured characteristic of object 12.

In this way, each subsystem 20, 22a, 22b is characterized by one or more parameters a–b, c–d, g–h associated therewith, respectively, that fully describe the variations thereof from nominal, predetermined values. Moreover, these variation indicating parameters a–b, c–d, g–h are mathematically combined to reflect a preferably minimum number of adjustment values $S_1$, $S_2$ of adjustable components 30a, 30b, respectively. More generally, the number n of adjustments $S_1$, $S_2$ (i.e., here n=2) is preferably less than the number x of subsystem describing parameters a, b, c, d, g, and h (i.e., here x=6). In this manner, variations associated with each separable subsystem 20, 22a, 22b are combined and corrected by a single adjustment of a minimum number of selected, adjustable components 30a, 30b. Note however that the number of parameters required to describe a particular subsystem, as well as the number and arrangement of adjustable components 30a, 30b may be varied. For example, adjustments $S_1$, $S_2$ may be matrices of more than one parameter or dimension. In the illustrative embodiment described below in conjunction with FIG. 2, the system is truncated in that adjustments $S_1$, $S_2$ are provided by mathematically combining parameters a–d, without additional parameters g, h. Put a different way, the front end circuit 22a and the signal conditioning circuit 22b jointly have two parameters c, d associated therewith, as will be described.

The procedure for determining the parameters of the transducer subsystem 20 and the signal conversion and conditioning subsystems 22a, 22b may be referred to as "virtual subsystem characterization" and will be described in detail below in conjunction with FIG. 2. Suffice it here to say however that subsystem characterization generally refers to a method by which each of the subsystem parameters is measured, or otherwise determined "Virtual" in conjunction with the characterization employed herein, indicates that the determined parameter information for a particular subsystem is not necessarily used in that subsystem to adjust that individual subsystem to a normalized, or variation free performance. Rather, such parameters are mathematically combined in accordance with equation (3) and used to adjust a selected, minimum number of adjustable component or components 30a, 30b within the generalized system of FIG. 1.

With this arrangement, an advantage over conventional subsystem level calibration is achieved in that the number of actual circuit adjustments may be minimized (i.e., as compared to adjusting each individual subsystem). That is, whereas conventional subsystem level calibration involves adjusting components within each subsystem in response to reference measurements, the present apparatus and method contemplates converting the set of variation indicating parameters from each subsystem into an adjustment for adjusting a minimum number of components located in the system at selected points so that, when thus adjusted, the system output signal 32 is calibrated, or brought into conformity with a specified standard, even though individual subsystem outputs may vary from a nominal, specified value. In this way, the time and labor required to calibrate the measurement system are reduced as compared to conventional subsystem level calibration.

Moreover, the present calibration apparatus and techniques do not suffer the drawback associated with conventional system level calibration by requiring "re-calibration" whenever a subsystem is added or replaced. When a subsystem of the present system is replaced, calibration is achieved by using the subsystem describing parameters associated with the replacement subsystem in the mathematical algorithm of equation (3), in combination with the parameters of the remaining, unreplaced subsystems, to determine a new set of adjustments. In this way, replacement and servicing of the transducer measurement system is simplified as compared to conventional system level calibration, thereby reducing the associated cost and potential down-time of the measurement system.

Referring now to FIG. 2, an illustrative embodiment of the system of FIG. 1 is shown to include two adjustable components 31a, 31b adjusted in accordance with adjustments $S_1$, $S_2$ as noted above. The transducer 20 is coupled in the feedback path of an operational amplifier 40, in a manner similar to that described in U.S. Pat. No. 4,918,376, issued on Apr. 17, 1990, assigned to the assignee of the present invention, and incorporated herein by reference. More particularly, the signal conditioning circuit 22b includes an AC drive signal source 42 providing an AC drive signal $V_d$ (related, or corresponding, to a nominal drive voltage setting $V_d'$) to an input terminal 44a of a gain adjusting, multiplying digital to analog converter (DAC) 44, the output terminal 44c of which is coupled via line 45 to the inverting input of an operational amplifier 46 through a resistor R2. The signal conditioning circuit 22b further includes signal conditioning circuitry such an as analog filter, filtering the intermediate signal 29 to provide the calibrated measurement signal 32. Resistor R4 is coupled in the feedback path of operational amplifier 46 and, in conjunction with resistor R2 and gain DAC 44, adjusts the gain of the measuring circuit 14. More particularly, a control terminal 44b of the gain DAC 44 is coupled to a digital word generator 31b that expresses the value $S_2$ to adjust the voltage at the output terminal 44c thereof. Digital word generator 31b may, for example, include a plurality of switches positioned to provide a ten bit digital input to DAC 44 in accordance with adjustment expression $S_2$ and in response to which the drive voltage $V_d$ is multiplied by a predetermined scale factor. In this way, the gain associated with the drive signal and thus, the transfer function of the signal conversion and conditioning circuit 22, is concomitantly adjusted.

The non-inverting input of operational amplifier 46 is coupled to the non-inverting input of an operational amplifier 40 through a resistor R6, as shown. Also coupled between the non-inverting inputs of operational amplifiers 40, 46 is the series combination of a resistor R8 and a second multiplying digital to analog converter (DAC) 50, referred to herein as linearity DAC 50. A resistor R10 is coupled between the non-inverting input of operational amplifier 46 and ground and the output of operational amplifier 46 is coupled to the inverting input of operational amplifier 40 through the reference capacitor $C_r$. The calibrated measurement signal 32 is provided at the non-inverting input of operational amplifier 40, as shown. A digital word generator 31a is coupled to a control terminal 50b of linearity DAC 50, in response to which the voltage at an input terminal 50a thereof is multiplied by a predetermined scale factor to provide the voltage at the output terminal 50c. Here again, the digital word generator 31a may comprise a plurality of switches positioned in accordance with adjustment expression $S_1$ to provide a ten bit digital input to DAC 50.

As mentioned above, the subsystem describing parameters of the transducer 20 and signal conversion and conditioning circuit 22 are determined via a characterization procedure. More particularly, in the illustrative embodiment of FIG. 2, the transducer 20 has two parameters associated therewith, each of which describes a variation thereof from a nominal, predetermined value; a transducer gain parameter $a=A_p$ and a transducer stray capacitance parameter $b=Co_1$. Likewise, the signal conversion and conditioning circuit 22 has two parameters associated therewith each of which describes a variation thereof from a nominal, predetermined value; a signal conversion and conditioning gain parameter $c=A_s$ and a signal conversion and conditioning stray capacitance parameter $d=Co_2$. If uncorrected or uncalibrated, non-unity values of the gain parameters $A_p$, $A_s$ would result in a gain or offset error term in the measurement signal; whereas, non-zero stray capacitance parameters $Co_1$, $Co_2$ would result in a linearity error term.

For purposes of discussing subsystem parameter characterization, the exemplary characteristic of the object 12 to be measured is distance, or displacement, (i.e, such as may be further used to determined flatness) and the transducer 20 is a capacitive probe. In this capacitive probe/distance measuring embodiment, the probe parameters are characterized by positioning the probe 20 at a first, approximate distance from the object 12, corresponding to a first probe output signal 27 having a first capacitance level $C_1$. The probe 20 is subsequently positioned at second and third positions from the object 12 whose incremental distances with respect to the first position are accurately known, resulting in output signals having second and third capacitance levels $C_2$, $C_3$, respectively. The three capacitance level values $C_1$–$C_3$ and corresponding incremental distance values from the first probe position are used to compute the probe gain parameter $a=A_p$ and the probe stray capacitance parameter $b=Co_1$. In computing parameters a, b, intermediate parameters $D_o$ and Z may first be calculated as follows:

$$Do = \frac{\Delta D2 \Delta D3 (C_1 - C_3)}{\Delta D3 (C_1 - C_2) + \Delta D2 (C_3 - C_1)} \quad (4)$$

$$Z = A \cdot \epsilon_o = \frac{Do(C_1 - C_2)(Do + \Delta D2)}{\Delta D2} \quad (5)$$

where $\Delta D2$ is the difference, or distance, between the first and second probe positions, $\Delta D3$ is the difference between the first and third probe positions and $\epsilon_o$ is the constant noted above in conjunction with equation (1). Parameters $a=A_p$ and $b=C_o$ may then be determined as follows:

$$a = A_p = \frac{Z}{A' \cdot \epsilon_o} \quad (6)$$

$$b = Co_1 = C_1 - \frac{Z}{Do} \quad (7)$$

where A' is the nominal, or specified active area of the probe 20, corresponding to an actual active area A.

In order to characterize the signal conversion and conditioning circuit 22, the gain parameter $A_s$ and the stray capacitance parameter $Co_2$ are determined. To this end, three measurements are taken, each with a different known capacitor value in place of the probe 20. That is, the probe 20 is replaced by a first, and subsequently a second and a third, capacitor standard $Cp_1$, $Cp_2$, and $Cp_3$ corresponding measurement signals $Vo_1$, $Vo_2$, and $Vo_3$ respectively, are measured on signal line 32. The three capacitance values $Cp_1$, $Cp_2$, and $Cp_3$ and the corresponding measured signals $Vo_1$, $Vo_2$, $Vo_3$ are then used to compute the gain parameter $c=A_s$ and the stray capacitance parameter $d=Co_2$ in accordance with the following equations:

$$C_{p1}C_{p2}(V_{o2} - V_{o1}) + \qquad (8)$$
$$c = Co_2 = \frac{C_{p1}C_{p3}(V_{o1} - V_{o3}) + C_{p2}C_{p3}(V_{p3} - V_{o2})}{C_{p3}(V_{o2} - V_{o1}) + C_{p2}(V_{o1} - V_{o3}) + C_{p1}(V_{o3} - V_{o2})}$$

$$d = A_s = \frac{(V_{o2} - V_{o1})(C_{p2} + C_{p2})(C_{p1} + Co_2)}{V_d'C_r'(C_{p1} - C_{p2})} \qquad (9)$$

where $Cr'$ is the nominal value of reference capacitor $C_r$ and $V_d'$ is the nominal AC drive voltage setting of AC source 42.

In response to the resulting gain parameters $a=A_p$, $c=A_s$ and the stray capacitance parameters $b=Co_1$, $d=Co_2$, such parameters are mathematically combined to provide adjustments $S_1$, $S_2$. More particularly, the gain parameters $A_p$, $A_s$ are combined to provide the adjustment $S_2$ and the stray capacitance parameters $Co_1$, $Co_2$ are combined to provide the adjustment $S_1$ as follows:

$$S_1 = 1024 \frac{\left[2p_a - \frac{C_s}{C_r} - 1\right]}{2p_b} \qquad (10)$$

$$S_2 = 1024 \cdot \frac{\left(10 - \frac{V_d' \cdot A_p}{A_s}\right)}{10} = 1024 \cdot \frac{10 - \frac{V_d' \cdot a}{c}}{10} \qquad (11)$$

where $C_s = Co_1 + Co_2$, $p_a$ is equal to R8R10/(R8R10+R8R6+R6R10), and $P_b$ is equal to R6R10/(R8R10+R8R6+R6R10).

With the ten bit inputs of DACs 44, 50 thus set, the measurement system provides calibrated measurement signal 32. That is, each one of the DACs 44, 50 corresponds to a degree of freedom of error of the measurement system so that when the digital word generators 31a, 31b are adjusted as described above, a calibrated, error free measurement signal 32, accurately indicating the measured characteristic, is provided. Moreover, the calibration is achieved in "real time" in the sense that once the adjustments $S_1$, $S_2$ are provided to the system, at no time thereafter is a "uncalibrated" measurement signal provided on line 32. For example, preferably, the adjustments are provided prior to installation, so that the adjustable components are continuously adjusted upon system power up.

Figure 3:
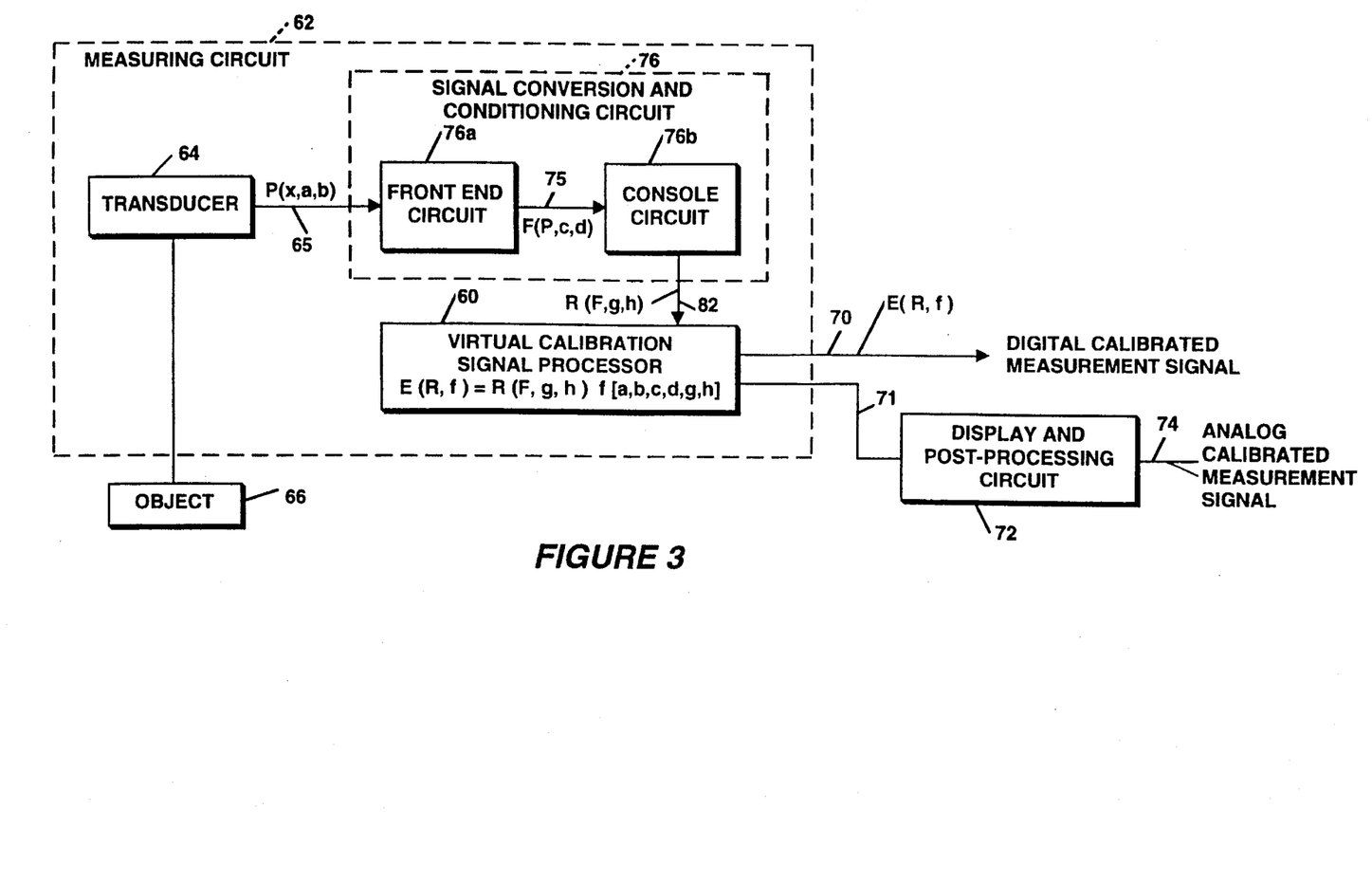
FIG. 3 is a block diagram of a calibrated transducer measurement system having a signal processor in accordance with an alternate embodiment of the present invention.

Referring now to FIG. 3, an alternate embodiment of the present invention is shown to include a virtual calibration signal processor 60. More particularly, the transducer measurement system of FIG. 3 includes a measuring circuit 62 having a transducer 64 interfacing with an object 66 to provide a calibrated measurement signal 70 indicative of a measured characteristic of the object 66. Like the measurement system of FIG. 1, the system of FIG. 3 includes a post-processing circuit 72. Here, in addition to providing display functionality, the post-processing circuit 72 converts a digital output signal 71 into an analog calibrated measurement signal 74, as will be described. The system of FIG. 3 operates in a somewhat like manner to the system of FIG. 1 in that, in response to a transducer output signal P(x, a, b) on line 65, a calibrated measurement signal 70 is provided. Unlike analog signal 32 (FIG. 2) however, signal 70 is a digital calibrated measurement signal. The virtual characterization process described above in conjunction with the measurement system of FIG. 1 may be used to provide subsystem describing, or variation indicating, parameters to the signal processor 60, as will be described. Here however, calibration is achieved by converting an analog measured signal 91 (FIG. 4) into a digital replica thereof R(F, g, h) on line 82 and the signal processor 60 operates on, or processes, such digital replica signal to provide the digital calibrated measurement signal E(R, f) on line 70. That is, the present embodiment does not provide adjustments $S_1$, $S_2$ for setting adjustable components 30a, 30b, respectively. Rather, the digital replica signal 82, or digitized version, of the measured signal 75, is processed to provide the digital calibrated measurement signal 70.

More particularly, measurement system of FIG. 3 includes transducer 64 interfacing with object 66 to provide transducer output signal 65, with the transducer 64 having at least one parameter, and here two parameters a, b, associated therewith and indicating variations thereof from nominal, specified values. A signal conversion and conditioning circuit 76 receives the transducer output signal 65 and includes a front end circuit 76a for converting the transducer output signal 65 into an intermediate signal 75 having a voltage amplitude related to the measured object characteristic. Circuit 76 further includes a signal conditioning circuit 76b for conditioning the intermediate signal 75 in the manner noted above in conjunction with signal conditioning circuit 22b (FIG. 2) and as further noted below. Here, however, signal conditioning circuit 76b additionally converts the conditioned intermediate signal 91 (FIG. 4) into a digital replica signal 82. Like transducer 64, signal conversion and conditioning circuit 76 has at least one, and here four, variation indicating parameters c, d, g, and h, associated therewith, as shown. The transducer parameters are provided to the signal processor 60 in a manner described below and the digital replica signal is provided to signal processor 60 via line 82.

Note that "virtual" is used in conjunction with signal processor 60 to indicate that component adjustments are not made to adjustable components. Rather, a digitized version of the transducer output signal as processed by the front end circuit 76a and signal conditioning circuit 76b, is processed to provide the digital calibrated measurement signal 70.

Figure 4:
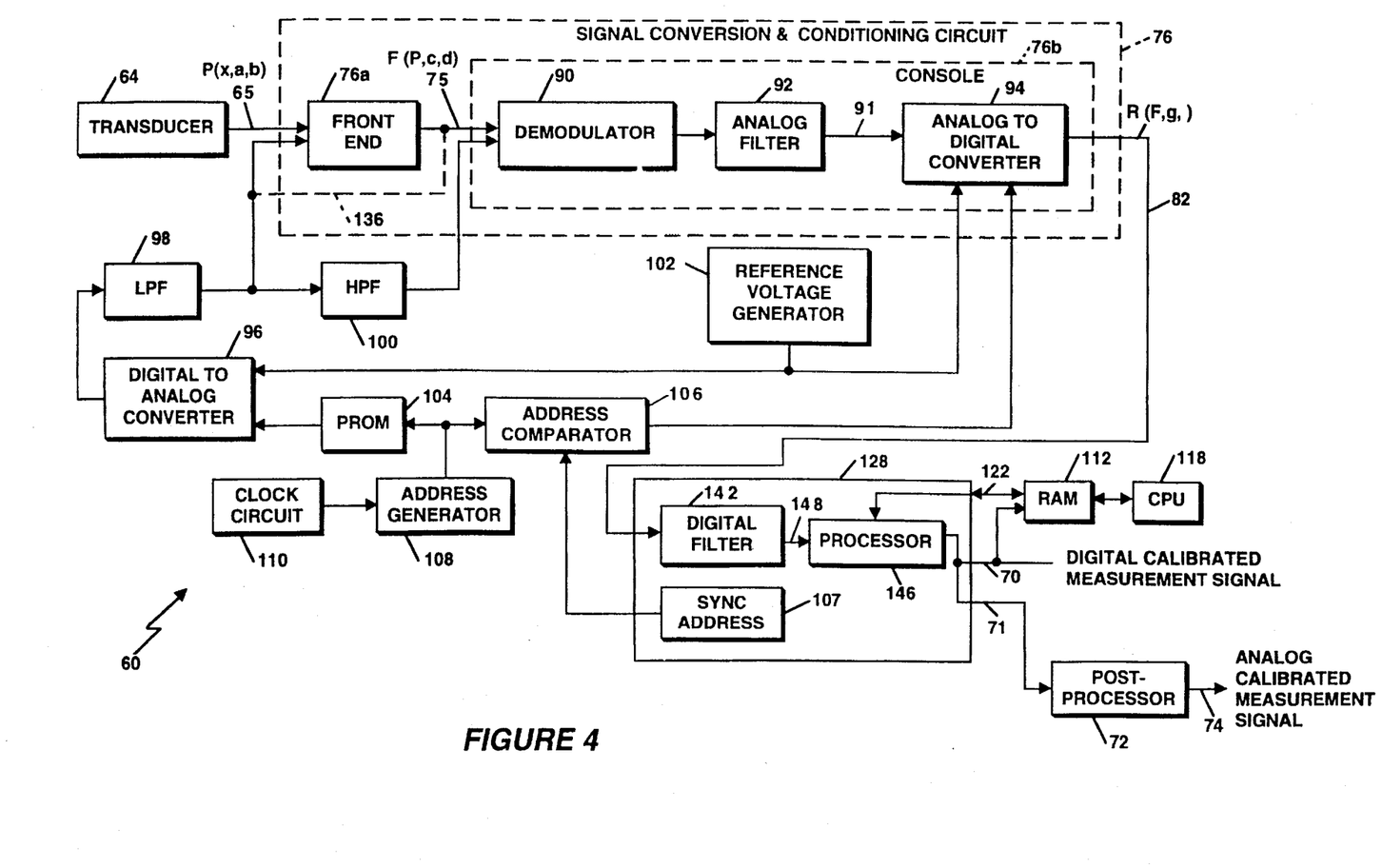
FIG. 4 is a detailed block diagram of an embodiment of the transducer measurement system of FIG. 3.

The manner in which the measurement system of FIG. 3 achieves virtual calibration will be better understood by referring now also to FIG. 4. Transducer 64 provides transducer output signal 65 to front end circuit 76a, in response to which front end circuit 76a provides intermediate signal 75. Front end circuit 76a may comprise the circuitry shown in FIG. 2, albeit with the exception of adjustable components 31a, 31b and DACs 44, 50. More generally, front end circuit 76a comprises circuitry suitable for converting the transducer output signal 65 into an electrical signal 75 having a voltage amplitude related to the measured object characteristic.

Signal conditioning circuit 76b receives the intermediate signal 75 and provides the digital replica signal 82, as shown. Signal conditioning circuit 76b includes a demodulator 90, an analog filter 92, and an analog to digital converter 94. The demodulator 90 and filter 92 comprise conventional signal conditioning circuitry, such as may comprise the signal conditioning circuit 22b of FIGS. 1 and 2. Here additionally, analog to digital converter 94 is provided which, as mentioned, converts the conditioned intermediate signal 75 into a digital replica thereof 82. The digital replica signal 82 is coupled to a processor 128, such as a digital signal processor (DSP) or other suitable processing device. Note that the virtual calibration signal processor 60 includes the DSP 128, as well as a digital to analog converter 96, a lowpass filter 98, a highpass filter 100, a reference voltage generator 102, a programmable read only memory (PROM) 104, an address comparator 106, an address generator 108, and a clock circuit 110. Also provided is a random access memory (RAM) 112 adapted to communicate with a CPU 118 to facilitate calibration of the measurement system. Here, the clock circuit 110 provides a clock signal to address generator 108, the output of which is an address provided to both the PROM 104 and the address comparator 106, as shown. Address comparator 106 compares addresses received from the sync address portion 107 of DSP 128 with that received by the address generator 108, in response to which the analog to digital converter 94 is triggered. With this arrangement, the analog to digital converter 94 is triggered in a synchronized manner with respect to preselected addresses of PROM 104 corresponding to points on a digitized sinewave stored therein.

In operation, demodulator 90 demodulates the analog intermediate signal 75 in accordance with a demodulation signal provided by highpass filter 100, as shown. The filtered, demodulated analog output signal 91 of filter 92 is further coupled to analog to digital converter 94, the digital replica output signal 82 of which is provided to DSP 128. Data bus 122 is coupled from the RAM 112 to the DSP 128 to provide subsystem parameter data (i.e., parameters a, b, c, d, g, and h) to the DSP 128.

Considering the characterization of the subsystem parameters, transducer subsystem 64, front end subsystem 76a, and signal conditioning subsystem 76b each has parameters a–b, c–d, and g–h associated therewith, respectively, describing variations thereof from nominal values associated with that particular subsystem. Characterization is performed individually on each such subsystem. Considering first the transducer 64, characterization of transducer 64 is achieved in the same manner as described above in conjunction with probe 20 (FIG. 2). That is, the transducer 64 is positioned at three different distances from the object 66 in accordance with which three corresponding transducer output signals are collected. The transducer gain parameter $A_p$ and stray capacitance parameter $Co_1$ are then computed in accordance with equations (4)–(7) above. The front end circuit 76a is characterized in the same manner as front end circuit 22a (FIG. 2). That is, three known capacitor standards are used in place of the transducer 64 and measurement signals are collected in response to each such capacitor standard. The front end gain parameter $A_s$ and the front end stray capacitance parameter $Co_2$ are then computed using equations (8) and (9) described above in conjunction with FIG. 2.

The signal conditioning circuit 76b may be characterized in terms of two parameters; a zero offset parameter $g=Z_o$ and a drive voltage parameter $h=V_d$. More particularly, drive voltage parameter $V_d$ refers to the actual drive voltage measured in response to a nominal drive voltage setting $V_d'$ of reference voltage circuit 102, as converted into a corresponding analog drive voltage by digital to analog converter 96. The zero offset $Z_o$ parameter refers to the actual drive signal measured in response to a nominal drive voltage setting of zero volts. In this way, the zero offset parameter is a measure of the signal offset value introduced by the signal conditioning circuitry.

In order to characterize the signal conditioning circuit 76b, a jumper 136 is positioned as shown by the dotted line in FIG. 4 and the front end circuit 76a is removed. Stated differently, front end circuit 76a is bypassed in order to ascertain the drive voltage parameter $V_d$ and the zero offset parameter $Z_o$. During characterization, a desired nominal drive voltage $V_d'$ is selected in accordance with the diameter of the probe 64 and the range, or distance, anticipated between the transducer 64 and the object 66. That is, a "look-up table" is used to select the nominal drive voltage level $V_d'$.

In operation, the above described transducer parameters $a=A_p$, $b=Co_1$, front end parameters $c=A_s$, $d=Co_2$, and signal conditioning parameters $g=V_d$, $h=Z_o$, which have been stored in RAM 112, are provided to the digital signal processor 128 via data bus 122. Signal processor 128 operates on the digital replica signal 82 in accordance with the above determined parameters to provide the digital calibrated measurement signal E(R, f) on line 70. More particularly, the DSP 128 includes a digital filter 142, such as a decimating FIR filter and a digital averaging filter. A processor 146, or processing portion thereof, receives the characterized subsystem parameters on data bus 122 and the filtered digital replica signal on line 148. In response to the characterized subsystem parameters, the processor 146 operates on, or processes, the filtered digital replica signal 148 to provide the digital calibrated measurement signal E(R, f) on line 70. More particularly, the processor 146 computes the digital calibrated measurement signal 70 in accordance with the following equation:

$$E(R,f) = \frac{K_2[R(F,g,h) - Z_o]}{K_1 - C_s[R(F,g,h) - Z_o]} = \frac{K_2[R(F,g,h) - h]}{K_1 - C_s[R(F,g,h) - h]} \quad (12)$$

where $C_s = Co_1 + Co_2$ and $K_1$ and $K_2$ are given by:

$$K_1 = A_s(V_d - Z_o) = c(V_d - h) \quad (13)$$

$$K_2 = A_p \epsilon_o = a \epsilon_o \quad (14)$$

The resulting digital calibrated measurement signal 70 is coupled to post processor 72, here including a digital to analog converter and a lowpass filter. The output of post-processor circuit 72 is an analog version of the digital calibrated measurement signal, or an analog calibrated measurement signal 74, such as may be desirable for providing an analog representation of the measured characteristic.

From the above discussion of the operation of measuring circuit 62, it is apparent that the virtual calibration signal processor 60 operates to provide calibration without actual circuit component adjustment. That is, the virtual calibration signal processor 60 operates on the digital replica signal 82 to provide a calibrated digital measurement signal 70 so that the calibration is achieved digitally.

Additionally, as with the measurement system of FIGS. 1 and 2, the measurement system of FIGS. 3 and 4 provides simplicity when replacing or adding a subsystem becomes necessary or desirable. That is, system re-calibration is not required to replace an individual subsystem of the measurement system. Rather, an individual subsystem, for example front end 76a, can be replaced simply by physical replacement of the subsystem and resetting parameters c and d in RAM 112 to the new subsystem describing values. More specifically, once the replacement subsystem is characterized in the manner described above and the determined c and d parameters associated therewith provided to the RAM 112 (FIG. 4), the entire measurement system operates in a calibrated manner so that the calibrated output signal 70 accurately indicates the measured characteristic.

It is noted however, that the virtual calibration signal processor 60 described above in conjunction with FIGS. 3 and 4 may be used with or without use of the subsystem characterization process described above. Although the calibrated measurement signals (i.e. both the digital signal 70 and the analog version thereof 74) may potentially be more accurate representations of the measured object characteristic when the above subsystem characterization accompanies calibration by the virtual calibration signal processor 60, the processor may nevertheless operate with initially, or factory, determined parameters. That is, when the transducer measurement system is manufactured, the RAM 112 may be loaded with predetermined subsystem parameters. As long as the subsystems used in conjunction therewith (i.e. or replacement such subsystems) are provided with like parameters, the virtual calibration signal processor 60 will maintain accurate calibration of the digital calibration measurement signal 70.

It is further noted that the parameters used in conjunction with the DSP 128 may be adjusted at any desired time by performing system calibration. That is, regardless of whether the parameters are initially determined at the factory or determined in accordance with the above-described virtual characterization procedure, such parameters may be updated and improved by performing subsequent system calibration. For example, the system calibration may indicate that the parameters currently in use by the DSP 128 no longer provide suitably accurate measurement results. With the information provided by a system calibration, the parameters may be adjusted.

Having described the preferred embodiments of the invention, it will now become apparent to one of skill in the art that other embodiments incorporating their concepts may be used. For example, the concepts described herein are applicable to various types of measurement systems comprising various constituent subsystems. Moreover, the apparatus and methods described herein for achieving measurement system calibration are equally applicable to dual channel transducer measurement systems simply by duplicating circuitry. It is felt therefore that these embodiments should not be limited to disclosed embodiments but rather should be limited only by the spirit and scope of the appended claims.

We claim:

1. A measurement system for measuring a characteristic of an object, said system comprising:

a transducer interfacing with said object to provide a transducer output signal, said transducer having at least one transducer parameter associated therewith; and a signal conversion and conditioning circuit, coupled to said transducer, for converting said transducer output signal into an intermediate signal having a voltage amplitude related to said measured object characteristic and providing a calibrated measurement signal indicative of said measured object characteristic, said circuit having at least one parameter associated therewith, wherein said signal conversion and conditioning circuit is adjustable in accordance with adjustments determined by a mathematical combination of at least two parameters selected from the at least one transducer parameter and the at least one signal conversion and conditioning parameter.

2. The measurement system recited in claim 1 wherein said signal conversion and conditioning circuit is adjustable in response to a digital word.

3. The measurement system recited in claim 1 wherein said signal conversion and conditioning circuit includes a plurality of adjustable circuit components, each one corresponding to a degree of freedom of error of said measurement system.

4. The measurement system recited in claim 3 wherein the number of adjustable circuit components is less than the number of transducer parameters plus the number of signal conversion and conditioning parameters.

5. The measurement system recited in claim 4 wherein said signal conversion and conditioning circuit comprises a first adjustable component for adjusting the gain of said intermediate signal and a second adjustable component for adjusting the linearity of said intermediate signal.

6. The measurement system recited in claim 5 wherein each of said first adjustable component and said second adjustable component comprises a switch coupled to a corresponding digital to analog converter receiving a digital input signal, wherein the digital input signal is set by positioning the corresponding switch.

7. The measurement system recited in claim 1 wherein said transducer has a gain parameter and a stray capacitance parameter associated therewith and said signal conversion and conditioning circuit has a gain parameter and a stray capacitance parameter associated therewith.

8. The measurement system recited in claim 1 wherein said at least one transducer parameter and said at least one signal conversion and conditioning circuit parameter are predetermined parameters.

9. A method for measuring a characteristic of an object, comprising the steps of:

measuring at least one parameter of a transducer to provide at least one transducer parameter value associated therewith, said transducer being adapted to interface with said object to provide a transducer output signal; and measuring at least one parameter of a signal conversion and conditioning circuit to provide at least one signal conversion and conditioning parameter value associated therewith, said circuit being adapted to convert said transducer output signal into an intermediate signal having a voltage amplitude related to said object characteristic for generating a calibrated measurement signal, wherein said signal conversion and conditioning circuit is adjustable in response to adjustments determined by a mathematical combination of at least two parameters selected from the at least one measured transducer parameter value and the at least one measured signal conversion and conditioning parameter value to generate said calibrated measurement signal.

10. The method recited in claim 9 further comprising the step of adjusting said signal conversion and conditioning circuit in accordance with said adjustments, wherein said adjustments correspond to degrees of freedom of error of said measurement system.

11. The method recited in claim 10 wherein said adjustments correspond to the gain of said intermediate signal and the linearity of said intermediate signal.

12. The method recited in claim 10 further comprising the step adjusting said signal conversion and conditioning circuit in accordance with mathematical combination of said at least one transducer parameter and said at least one signal conversion and conditioning parameter.

13. A method for measuring a characteristic of an object, comprising the steps of:

measuring at least one parameter of a transducer to provide at least one transducer parameter value associated therewith, said transducer being adapted to interface with said object to provide a transducer output signal, wherein the step of measuring at least one parameter of a transducer includes the steps of measuring a transducer gain parameter and a transducer stray capacitance parameter;

measuring at least one parameter of a signal conversion ad conditioning circuit to provide at least one signal conversion and conditioning parameter value associated therewith, said circuit being adapted to convert said transducer output signal into an intermediate signal having a voltage amplitude related to said object characteristic for generating a calibrated measurement, signal, wherein said signal conversion and conditioning circuit is adjustable in response to adjustments determined by a mathematical combination of at least one of: the at least one transducer parameter value and the at least one signal conversion and conditioning parameter value to generate said calibrated measurement signal, and wherein said step of measuring at least one parameter of a signal conversion and conditioning circuit includes the steps of measuring a signal conversion and conditioning gain parameter and a signal conversion and conditioning stray capacitance parameter; and adjusting said signal conversion and conditioning circuit in accordance with said adjustments, wherein said adjustments correspond to degrees of freedom of error of said measurement system.

\* \* \* \* \*